(No Model.)

G. P. VICKEN.
CANDLE MOLD GAGE.

No. 282,133. Patented July 31, 1883.

UNITED STATES PATENT OFFICE.

GEORGE P. VICKEN, OF CINCINNATI, OHIO, ASSIGNOR TO HOMAN & CO., OF SAME PLACE.

CANDLE-MOLD GAGE.

SPECIFICATION forming part of Letters Patent No. 282,153, dated July 31, 1883.

Application filed June 22, 1883. (No model.)

*To all whom it may concern:*

Be it known that I, GEORGE P. VICKEN, a citizen of the United States, residing at Cincinnati, in the county of Hamilton and State of Ohio, have invented certain new and useful Improvements in Candle-Mold Gages, of which the following is a specification, reference being had therein to the accompanying drawings.

The object of my invention is to enable the follower of a candle-molding machine to be arrested in a perfectly level or horizontal position when lowered, in order that the various pistons attached to said follower may descend uniformly, and thereby produce candles of precisely the same length. This result is accomplished by supporting the follower on a pair of nuts that engage with screws of the same diameter and pitch, said screws being near the opposite ends of the machine, and having attached to them bevel-pinions that mesh into similar gears keyed to a horizontal shaft journaled longitudinally of the main frame and near the bottom of the same. This horizontal shaft is adapted to be operated either with a crank or hand-wheel, the proper turning of which crank will raise or lower these nuts, and thereby arrest the descending follower in a level position, as hereinafter more fully described.

Figure 1:
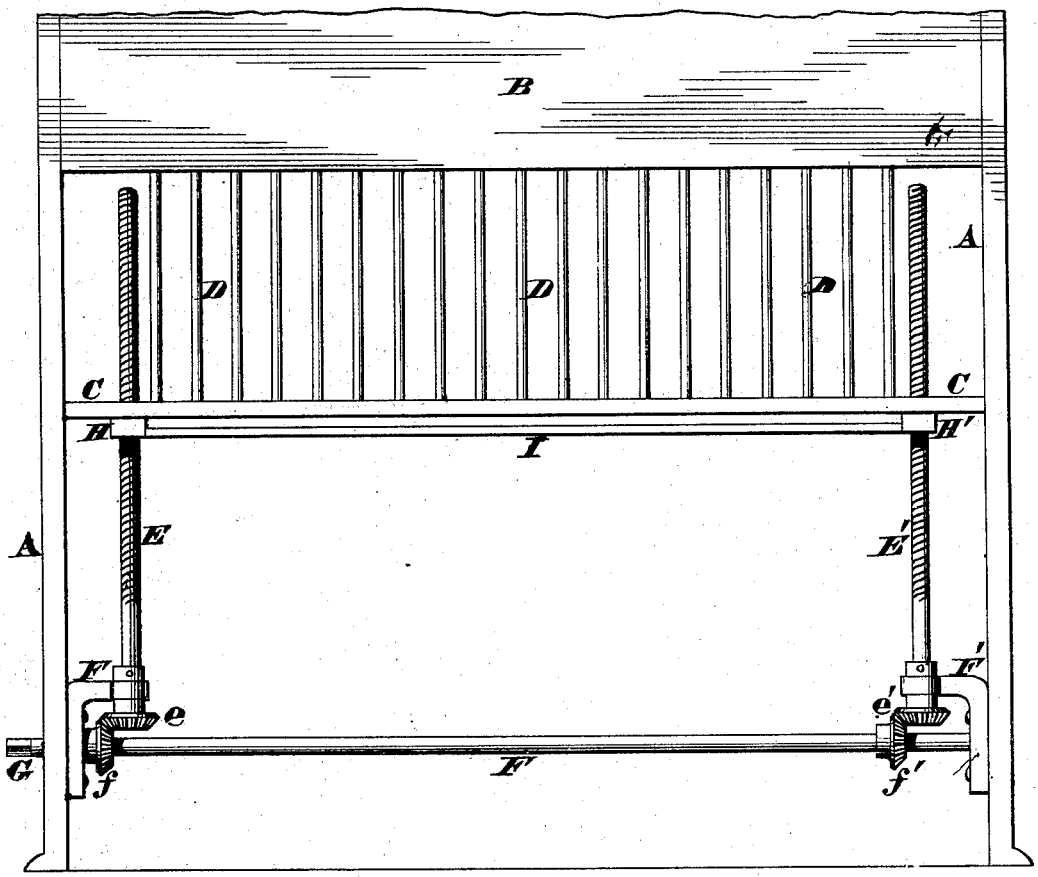
Figure 2:
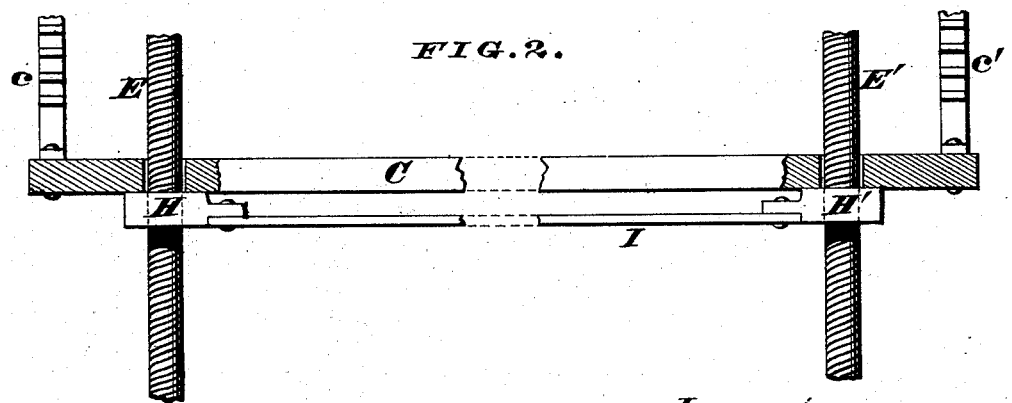

In the annexed drawings, Figure 1 is a side elevation of a portion of a candle-molding machine embodying my improvements. Fig. 2 is an enlarged section of the follower and its supporting devices, the central portion of said follower being broken away and the pistons omitted.

A represents portions of the end frames of a candle-molding machine, and B is part of the steam-box of the same, the molds being fitted in said box in the usual manner. C represents the follower, having attached to it a series of tubular pistons, D, through which the wicks pass, each of said pistons being provided with an ordinary head that traverses the respective mold, as in all machines of this class. Furthermore, the follower C is raised and lowered with the customary construction of racks and pinions, which devices, being familiar to manufacturers of candle-molding machines, require no further description in this specification. Portions of said racks, however, are seen at $c\ c'$ in Fig. 2. The opposite ends of follower C are traversed by the screws E E', of uniform diameter and pitch, said screws being journaled in bearings F F', that are either cast with or bolted to the frames A A, the extreme lower ends of these screws being provided with bevel-pinions $e\ e'$, that engage with similar gears, $f f'$, of the horizontal shaft F. This shaft is journaled longitudinally of the machine, and has at either or both ends a non-circular arbor, G, to receive a crank or hand wheel, wherewith said shaft may be readily turned, so as to either raise or lower the supporting-nuts H H'. These nuts are the only members the screws E E' engage with, as the latter pass freely through holes in the follower C, as seen in Fig. 2. Furthermore, these nuts H H' are connected with a bar or stretcher, I, that retains them in their proper positions.

From this description it is apparent that by turning the shaft I both of the nuts will be caused to move in unison, either up or down, according to the length of candle desired. Consequently said follower will always be arrested in a perfectly level position, and, as a matter of course, the upper ends of the attached pistons D will be parallel with the follower C; hence it is apparent that the candles formed in the molds will be exactly of the same length, which advantage cannot be obtained in those machines that employ a pair of independently-operated nuts or gages to support the opposite ends of the follower. These independently-operated gages or nuts are seldom, if ever, properly set, and in some cases only one is adjusted and the other one neglected, thereby arresting the follower in a canted or inclined position, and causing a variation of an inch or more in candles which should be of exactly the same length and weight. Furthermore, these independently-operated nuts or bearings must be turned from the inside of the frame with wrenches or levers, thereby interfering with the wicks, and sometimes necessitating the removal of the wick-spools; but with my construction the wicks are never deranged, neither are the spools removed.

I claim as my invention—

In combination with a candle-molding machine of the class specified, the follower C, pistons D, screws E E', bevel-gears $e\ e'\ f\ f'$, shaft F, supporting-nuts H H', and connecting-bar I, said screws being arranged to play freely in said follower, as and for the purpose stated.

In testimony whereof I affix my signature in presence of two witnesses.

GEORGE P. VICKEN.

Witnesses:
JAMES H. LAYMAN,
LOUIS HOMAN.